(12) United States Patent
Zhang

(10) Patent No.: US 6,230,282 B1
(45) Date of Patent: May 8, 2001

(54) CHECKPOINT COMPUTER SYSTEM UTILIZING A FIFO BUFFER TO RE-SYNCHRONIZE THE MEMORY SYSTEMS ON THE DETECTION OF AN ERROR

(75) Inventor: Zheng Zhang, Mountain View, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/111,250

(22) Filed: Jul. 3, 1998

(51) Int. Cl.[7] ........................................... G06F 11/16
(52) U.S. Cl. ...................................... 714/6; 714/13
(58) Field of Search ...................... 712/31, 228; 714/13, 714/6; 711/141

(56) References Cited

U.S. PATENT DOCUMENTS

| 5,381,545 | * | 1/1995 | Baker et al. | 714/19 |
| 5,745,672 | * | 4/1998 | Stiffler | 714/6 |
| 5,913,021 | * | 6/1999 | Masubuchi | 711/141 |
| 5,958,070 | * | 9/1999 | Stiffler | 714/13 |
| 6,079,030 | * | 6/2000 | Masubuchi | 714/15 |

* cited by examiner

Primary Examiner—John F. Niebling
Assistant Examiner—Stacy Whitmore

(57) ABSTRACT

A computer system having a checkpoint error recovery system. The computer system includes a first computer having a first memory and a second computer having a second memory and a buffer. The first and second memories are updated by memory updates that include an address specifying a location and data to be written to the memory receiving the update at the location. The computer system also includes an interface for providing the second computer with a copy of each memory update received by the first memory. Upon receiving each of the copies of the memory updates, the second computer generates a recovery memory update corresponding to that copy of the memory update. The recovery memory update includes the data stored in the second memory at the address specified in the first memory update and the address specified in the received copy. The second computer then updates the second memory using the copy of the memory update, and writes the recovery memory update into the buffer if the buffer does not contain one of the recovery memory updates for the address in the recovery memory update. The second computer empties the buffer upon the receipt of a checkpoint interval signal. The second computer updates the second memory with the recovery memory updates stored in the buffer in response to the receipt of an error signal. The recovery memory updates are performed in the order the recovery memory updates were stored in the buffer.

6 Claims, 2 Drawing Sheets

CHECKPOINT COMPUTER SYSTEM UTILIZING A FIFO BUFFER TO RE-SYNCHRONIZE THE MEMORY SYSTEMS ON THE DETECTION OF AN ERROR

FIELD OF THE INVENTION

The present invention relates to fault tolerant computers, and more particularly, to computer systems that utilize a checkpointing error recovery system to recover from a system failure.

BACKGROUND OF THE INVENTION

One type of fault tolerant computer system utilizes a fault detection system that depends on the state of the computer being periodically recorded. In one version of this type of system, the state of the computer is recorded in a second "slave" computer. If an error is detected between checkpoints, the slave computer takes over from the state recorded at the last checkpoint. When a cache line is written into the memory of the "master" computer, the same cache line is copied into a buffer in the slave computer system. At each checkpoint, the contents of the buffer are written into the memory of the slave computer thereby bringing the master and slave memories into synchronization at the checkpoint. If a failure occurs, the slave computer's memory is already synchronized with the master computer at the state that existed at the last check point. Hence, the slave computer can take over the computation starting from that point.

The buffer is typically first-in-first-out (FIFO). The FIFO must be large enough to store all of the writes that occur between checkpoints. If a buffer overflow occurs, the state of the two systems will not be synchronized at the next checkpoint, and the error recovery system will fail. Accordingly, a large FIFO must be utilized. Such a buffer increases the cost of the system.

Unfortunately, there is no guaranteed FIFO size that will guarantee that an overflow will not occur. Consider a case in which the FIFO gradually accumulates data during a checkpoint period. The transfer of the data to the slave memory for this checkpoint period does not start until the checkpoint period is completed. At this point the slave begins to read entries from the FIFO and write those entries into the slave's memory. In the meantime, checkpoint data for the next period is arriving at the FIFO for storage. The FIFO now holds partial checkpoint data for the previous period and the current period. If the inflow rate is particularly high, the FIFO can have more than two intervals worth of data stored in it. The ultimate limit on the rate of data accumulation is determined by the speed at which the slave computer can read the FIFO and then write its main memory. If the applications are generating a series of writes with no intervening memory cycles, the data will accumulate in the FIFO. The extent of the accumulation depends on the density of writes; hence, there is no guaranteed FIFO size that will assure that a failure will not occur. Such a failure would require stopping both machines and copying the master memory in its entirety into the slave memory. Since the memories in question may be quite large, it is advantageous to avoid such system failures.

Broadly, it is the object of the present invention to provide an improved checkpoint memory system.

It is a further object of the present invention to provide a checkpoint memory system that requires less FIFO buffer space than prior art systems.

It is a still further object of the present invention to provide a checkpoint memory system that does not fail if a buffer overflow occurs.

These and other objects of the present invention will become apparent to those skilled in the art from the following detailed description of the invention and the accompanying drawings.

SUMMARY OF THE INVENTION

The present invention is a computer system having a checkpoint error recovery system. The computer system includes a first computer having a first memory and a second computer having a second memory and a buffer. The first and second memories are updated by memory updates that include an address specifying a location and data to be written to the memory receiving the update at the location. The computer system also includes an interface for providing the second computer with a copy of each memory update received by the first memory. Upon receiving each of the copies of the memory updates, the second computer generates a recovery memory update corresponding to that copy of the memory update. The recovery memory update includes the data stored in the second memory at the address specified in the first memory update and the address specified in the received copy. The second computer then updates the second memory using the copy of the memory update, and writes the recovery memory update into the buffer if the buffer does not contain one of the recovery memory updates for the address in the recovery memory update. The second computer empties the buffer upon the receipt of a checkpoint interval signal. The second computer updates the second memory with the recovery memory updates stored in the buffer in response to the receipt of an error signal. The recovery memory updates are performed in the order the recovery memory updates were stored in the buffer.

DETAILED DESCRIPTION OF THE INVENTION

Figure 1:
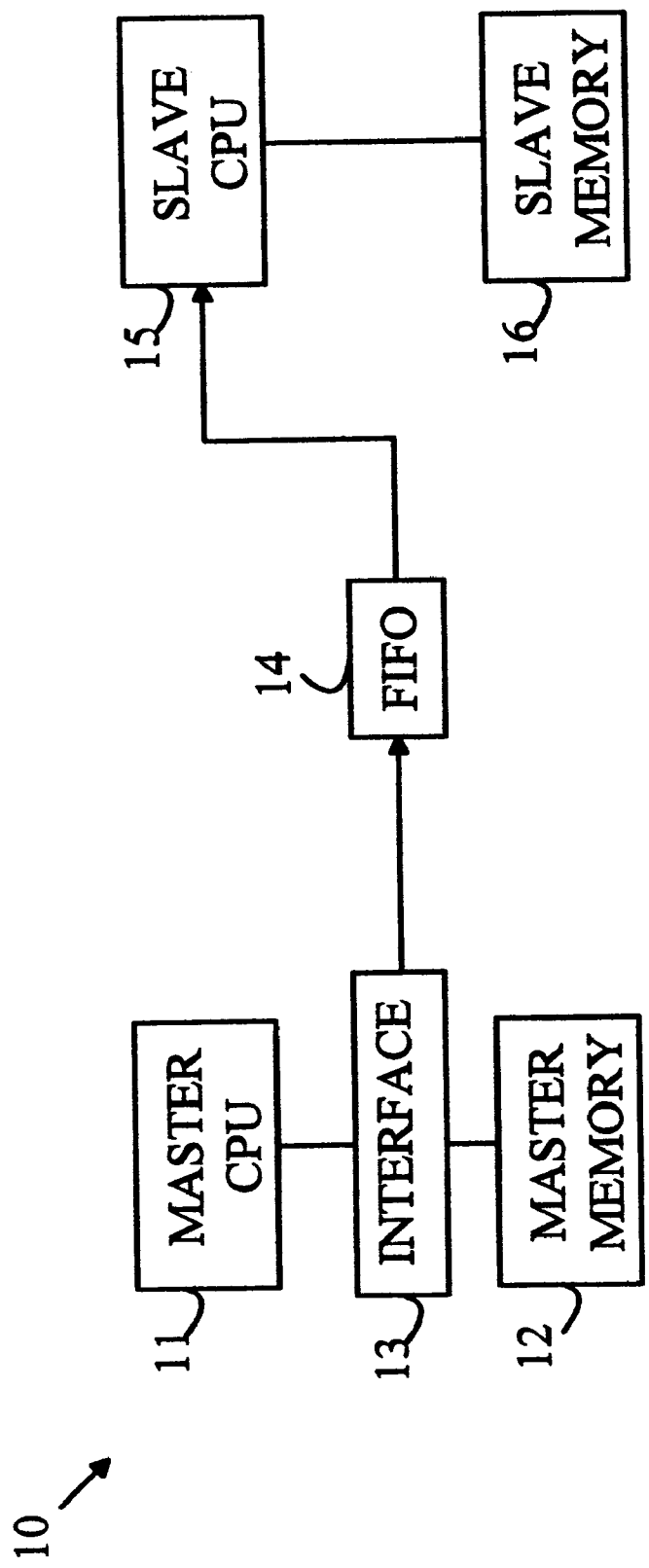
FIG. 1 is a block diagram of a prior art checkpoint system.

The manner in which the present invention provides its advantages may be more easily understood with reference to FIG. 1 which is a block diagram of a prior art checkpoint system 10. Checkpoint system 10 includes a master CPU 11, which stores data in a master memory 12. CPU 11 is assumed to include at least one cache and may include a plurality of processors, each with its own cache. Master memory 12 is read and written in cache lines having several words per line. Each time a line is written into master memory 12, a copy of the line is transferred to a FIFO that is connected to slave CPU 15. The copy is generated by a circuit 13 that bridges the memory bus connecting CPU 11 to master memory 12. At periodic intervals, slave CPU 15 generates, or receives, a checkpoint signal. The signal may be generated internally via an interrupt timer associated with either CPU 11 or CPU 15, or the signal may be generated by hardware that is external to both CPU's.

When the checkpoint signal is received by slave CPU 15, a marker is placed in FIFO buffer 14 indicating the last line read into FIFO buffer 14 prior to the generation of the checkpoint signal. CPU 15 then reads out the contents of FIFO buffer 14 and stores the cache lines in slave memory 16. The states of the internal registers in CPU 111 are also stored at the beginning of each checkpoint cycle. These may also be stored at a predetermined location in slave memory 16 by transferring them as a special cache line to master memory 12, which, in turn, will cause them to be stored in FIFO 14.

If an error occurs in the master computer system and the master computer system cannot recover from the error, program execution is transferred to the slave computer system, which begins execution from the last checkpoint. The contents of the master and slave memories are synchronized as of that checkpoint. Hence, slave CPU 15 must load its registers from the register images stored at the end of the last checkpoint interval and pick up where the master computer left off. In this case, the contents of FIFO buffer 14 are dumped.

As noted above, this scheme has a number of problems. The scheme requires a very large FIFO buffer. And even with a large FIFO buffer, there is no guarantee that the capacity of the FIFO buffer will not be exceeded. When the capacity is exceeded, the error recovery system is defeated as the memories will no longer be synchronized at the end of the next checkpoint, since part of the data needed to synchronize the memories will have been lost.

Figure 2:
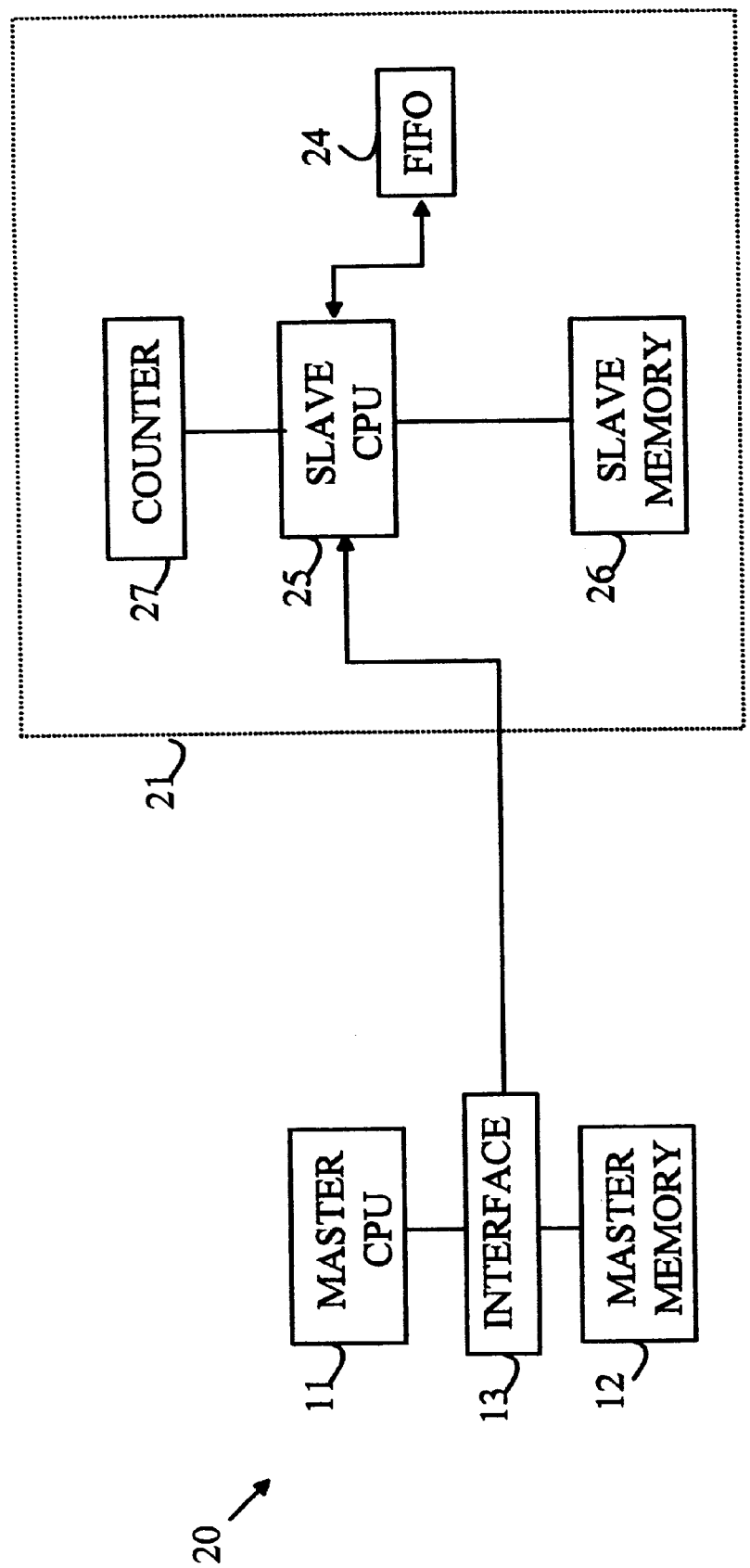
FIG. 2 is a block diagram of a checkpoint system according to the present invention.

The present invention avoids these problems by keeping the master and slave memories synchronized at all times and utilizing the FIFO buffer for storing the data needed to return the slave memory to its state at the end of the last checkpoint period. In essence, the FIFO stores recovery updates that when executed in the order stored, undo the memory updates that occurred since the last checkpoint signal was received. The recovery updates are the lines that have been overwritten in the main memory since the last checkpoint. Refer now to FIG. 2 which is block diagram of a checkpoint system 20 according to the present invention. In the present invention, each time a memory line is updated in master memory 12, the new line is sent via bridge circuit 13 to slave computer system 21. This line is immediately stored in slave memory 26 by slave computer 25. Prior to storing the line, slave computer 25 reads out the previous contents of the line and stores the old line data in FIFO 24 together with the address in the slave memory that was updated. Hence, slave memory 26 is always synchronized with master memory 12. If an error occurs, the contents of FIFO 24 are read back into slave memory 26 thereby returning slave memory 26 to the state that it had at the beginning of the last checkpoint.

When CPU 25 receives a checkpoint signal, slave computer 21 merely resets FIFO buffer 24 thereby dumping the contents of FIFO buffer 24 which are no longer needed.

It should be noted that FIFO buffer 24 only needs to hold the number of lines that were updated in one checkpoint period. Hence, FIFO buffer 24 does not need to be as large as FIFO buffer 14.

Further an overflow in FIFO buffer 24 will not cause a problem unless the overflow occurs during a checkpoint interval in which an error requiring slave computer 25 to take over the computation occurs. If an overflow occurs in any other checkpoint interval, the overflow is harmless, since the contents of FIFO buffer 24 will be dumped at the next checkpoint signal anyway. In addition, CPU 25 can monitor the contents of FIFO buffer 24 and generate a checkpoint signal if it determines that FIFO buffer 24 has insufficient space to assure that it will not make it to the next regular check point without a possible overflow. Accordingly, the overflow problems inherent in the prior art may be completely avoided in the present invention.

It should be noted that the generation of an additional checkpoint signal when the FIFO is near full would not necessarily save the prior art systems. Consider the case in which there are N checkpoint intervals worth of data backed up in the prior art FIFO buffer. In this case, the slave computer system already has permission to push all but the last checkpoint interval's data into the slave memory. That is checkpoint intervals 1 to N−1 are waiting to go into the slave memory. These intervals are still in the buffer because the rate of acquisition of new updates has exceeded the rate at which the slave computer can store them. Generating another checkpoint signal merely gives the slave computer permission to continue pushing the updates for interval N into the slave memory when it finally finishes with interval N−1. It does nothing to reduce the rate at which updates are being generated.

The FIFO buffer system of the present invention avoids this problem for two reasons. First, an error is not necessarily fatal, and second, the update scheme of the present invention requires one fewer cycles per update. The prior art system reads the register having the update, writes the update to the FIFO, reads data from a different location in the FIFO and writes that data to the slave memory. The update system of the present invention makes use of the fact that the memories typically include an instruction which enables a processor to read the current contents of a location and update the contents of that location in a single cycle. Hence, the present invention reads the update from the register, writes it to the slave memory and receives the previous contents for that location in the same instruction. The contents are then written to the FIFO.

The size of the FIFO can be reduced further by observing that a second update for any given cache line during any given checkpoint interval need not be stored in the FIFO. If an error occurs during a checkpoint interval, the second update will be overwritten by the first update that is already stored in the FIFO. In principle, each update can be checked against the entire current contents of the FIFO by CPU 25 to determine if a previous entry for the cache line in question has been stored. If a previous entry is found, CPU 25 discards the latest update. Unfortunately, this strategy imposes a significant computational load on CPU 25, and hence, is not the preferred implementation.

In the preferred embodiment of the present invention, the check can be accomplished by utilizing part of the cache line stored in slave memory 26 to store a counter value indicative of the checkpoint cycle in which the last update for that cache line occurred. To simplify the following discussion, assume that each cache line has a counter field, which is not used for storing the data in the actual cache line. Each time an update is received by slave CPU 25 for a cache line, CPU 25 reads the current contents of that cache line from memory 26 including the contents of this counter field. CPU 25 then compares the contents of the counter field to the contents of a counter 27, which is incremented at the end of each checkpoint interval. If the contents match, then a previous update for the cache line in question has been received and stored in the FIFO. CPU 25 then stores the new update in memory 26 and discards the previous contents for that cache line. If the counter field does not match the contents of the counter, then CPU 25 updates the contents of the counter field for that cache line to the current counter value and stores the new cache line both in memory 26 and FIFO buffer 24.

This method assumes that a counter field is available for each cache line in memory 26. In general, each cache line includes a status field whose bits are reserved for storing information indicating which cache memories hold copies of the line and whether or not those copies are exclusive or shared. This information is of no value to the slave system until the slave system actually takes over the computation after an error. At that time, all of the cache status fields are reset since the cache memories in the slave system must start out empty. Accordingly, the cache status bits are available for storing the counter value during the period in which the slave system is mirroring the master system.

For the counter scheme to perform properly, each counter must be updated at least once every $2^N$ checkpoint intervals, where N is the number of bits in the counter field. Unless such an update occurs, there is the possibility that the counter overflows and returns to the number stored in the counter field at exactly the checkpoint interval number in which the first update to the cache line is received. That is, the last counter value stored with the cache line accidentally matches the current counter value. In this case, the update will not be placed in the FIFO. If an error requiring the slave computer to take over the computation occurs during this checkpoint interval, the slave memory will be in error when the contents of the FIFO are read back into the slave memory.

This situation can be avoided by resetting all of the counter fields in the slave memory when counter 27 overflows. This solution imposes an overhead on the slave computer system. However, if the number of bits in the counter field is sufficiently large, this overhead is relatively small. For example, if 20 bits are reserved for cache tag information, then the counter field will overflow once every $2^{20}$ checkpoint cycles. If a checkpoint cycle occurs every 25 ms, then an update is needed once every 7 hours. Hence, the cost of resetting the system can be amortized over a sufficiently long period to make the reset cost negligible if sufficient bits are available in the cache tag field.

Another method for avoiding the storage of duplicate entries is to store the address of the FIFO entry into which the last update for the cache line in question was stored in the cache tag bits. To simplify the following discussion, denote the address in the slave memory of a cache line by the cache line address. Denote the address in the FIFO at which a cache line is stored as the FIFO address.

In this embodiment of the present invention, the FIFO address is stored in the cache tag bits each time a cache line is received and the old contents of this cache line are written into the FIFO. When the slave system performs a memory update, it reads the old cache line. The slave system checks the cache tag bits for the address in the FIFO at which the last update was stored. The slave system then reads this line from the FIFO and checks the cache line address of the line stored at that FIFO address. If the addresses match, then the current line can be discarded without storing it in the FIFO. If the line stored at that address in the cache does not correspond to the cache line address that is currently being updated in the slave memory, then the slave system knows that this is the first update for this cache line in the current checkpoint system. In this case, the cache line is stored at the next available address in the FIFO and the FIFO address is placed in the cache tag field of the cache line.

It should be noted that each time a FIFO address is checked, the slave system must first test to see if the pointer indicating the current top of the FIFO buffer is at an address less than the cache address being checked. In general, a FIFO can be viewed as a memory buffer having a first address, a maximum address, and a pointer having the next free address into which data may be stored. When the FIFO is reset, the pointer is set to the first address. If the FIFO address being queried is greater than pointer minus one, then the address is not valid, i.e., no data has yet been stored at that address in the current check point cycle. In this case, the slave system knows that this is the first update for the cache line in question and stores a copy of the old contents for this line in the FIFO.

The above embodiments of the present invention that utilize a counter to keep track of the checkpoint intervals refer to incrementing the counter until it overflows. However, it will be obvious to those skilled in the art from the preceding discussion that the counter may be decremented until it underflows without deviating from the teachings of the present invention. Accordingly, it is to be understood that the counter may be "incremented" with a negative increment, thereby leading to a decrement in the counter value.

It is also to be understood that the slave computer, the master computer or hardware independent of either computer, can generate the checkpoint signal. Hence, the slave computer may receive a checkpoint signal generated by any device, including the slave computer itself.

The above embodiments of the present invention have been described in terms of the CPU in the slave computer performing the memory updates and generation of the recovery memory updates. However, it will be obvious to those skilled in the art from the preceding discussion that one or more of these functions can be performed by special purpose hardware that is part of the slave computer system. In general, this special purpose hardware would (1) read the contents of the slave memory at the address contained in the update from the master computer, (2) write the update into the slave memory, and then (3) push the old contents of the slave memory read in (1) into the FIFO.

Various modifications to the present invention will become apparent to those skilled in the art from the foregoing description and accompanying drawings. Accordingly, the present invention is to be limited solely by the scope of the following claims.

What is claimed is:

1. A computer system comprising:

a first computer having a first memory;

a second computer having a second memory and a buffer, said first and second memories being updated by a memory update comprising an address specifying a location and data to be written to said first and second memories at said location;

an interface for providing said second computer with a copy of each memory update received by said first memory;

wherein, upon receiving each of said copies of said memory updates, said second computer (1) generates a recovery memory update corresponding to that copy of said memory update, said recovery memory update comprising the data stored in said second memory at the address specified in said first memory update and the address specified in said received copy, (2) updates said second memory using said copy of said memory update, and (3) writes said recovery memory update into said buffer if, and only if, said buffer does not contain one of said recovery memory updates for said address in said recovery memory update, wherein said second computer empties said buffer upon the receipt of a checkpoint interval signal, and wherein said second computer updates said second memory with said recovery memory updates stored in said buffer in response to the receipt of an error signal, said recovery memory updates being performed in the order said recovery memory updates were stored in said buffer.

2. The computer system of claim 1 wherein said second computer further comprises a counter for storing a value that is incremented each time said checkpoint interval is received by said second computer and wherein said value is stored with said data received in each memory update and wherein said value is compared with a value stored in said recovery memory update to determine if said buffer contains one of said recovery updates for said address in that recovery update.

3. The computer system of claim 2 wherein said counter is reset each time said counter overflows.

4. The computer system of claim 2 wherein said first and second memories include a plurality of cache tag fields, one of said cache tag fields being associated with each address in said first and second memories and wherein said counter value is stored in said cache tag field corresponding to the address of said memory update.

5. The computer system of claim 1 wherein said second computer stores the location in said buffer at which the last recovery memory update for each address in said second memory was stored in said buffer and wherein said second computer compares the contents of said buffer at the address stored for one of said recovery memory updates to determine if said buffer contains one of said recovery memory updates for that address in said second memory.

6. The computer system of claim 5 wherein said first and second memories include a plurality of cache tag fields, one of said cache tag fields being associated with each address in said memory and wherein said location in said buffer is stored in the cache tag field corresponding to the address of said recovery memory update.

* * * * *